US012803063B2

(12) United States Patent
Cai et al.

(10) Patent No.: US 12,803,063 B2
(45) Date of Patent: Nov. 17, 2026

(54) LEAKAGE DETECTION DEVICE

(71) Applicant: WUXI LEAD INTELLIGENT EQUIPMENT CO., LTD., Wuxi (CN)

(72) Inventors: Rui Cai, Jiangsu (CN); Mingsheng Wang, Jiangsu (CN); Xiaofei Chen, Jiangsu (CN)

(73) Assignee: Wuxi Lead Intelligent Equipment Co., Ltd., Wuxi (CN)

( * ) Notice: Subject to any disclaimer, the term of this patent is extended or adjusted under 35 U.S.C. 154(b) by 350 days.

(21) Appl. No.: 18/682,001

(22) PCT Filed: Sep. 6, 2022

(86) PCT No.: PCT/CN2022/117283
§ 371 (c)(1),
(2) Date: Feb. 7, 2024

(87) PCT Pub. No.: WO2023/168917
PCT Pub. Date: Sep. 14, 2023

(65) Prior Publication Data

US 2025/0125427 A1 Apr. 17, 2025

(30) Foreign Application Priority Data

Mar. 11, 2022 (CN) ......................... 202210235616.1

(51) Int. Cl.
*H01M 10/42* (2006.01)
*G01M 3/04* (2006.01)

(52) U.S. Cl.
CPC ......... *H01M 10/4228* (2013.01); *G01M 3/04* (2013.01); *H01M 10/4285* (2013.01)

(58) Field of Classification Search
CPC ......... H01M 10/4228; H01M 10/4285; G01M 3/04; G01M 3/26; G01M 3/34; Y02E 60/10
See application file for complete search history.

(56) References Cited

U.S. PATENT DOCUMENTS 11,860,064 B2 * 1/2024 Ying .................... G01M 3/229

FOREIGN PATENT DOCUMENTS

CN 110132507 A * 8/2019 ............. G01M 3/34
CN 210625983 U 5/2020
(Continued)

OTHER PUBLICATIONS

English translation for CN-110132507-A.*

*Primary Examiner* — Xin Y Zhong
(74) *Attorney, Agent, or Firm* — Baker Botts LLP

(57) ABSTRACT

The subject matter relates to a leakage inspection device, which comprises a sealing box, a first inspecting component and a second inspecting component. The sealing box is provided with a sealing cavity for accommodating a work-piece; both the first inspecting component and the second inspecting component comprise a communicating state, an inspecting state, and a discharging state. The battery is placed inside the sealing cavity: firstly, switching the first inspecting component to the communicating state, switching the second inspecting component to the discharging state, vacuumizing the sealing cavity by the gas extracting device, and then switching the first inspecting component to the inspecting state to detect whether there is volatile gas in the sealing cavity, so as to determine whether the battery leaks.

10 Claims, 1 Drawing Sheet

(56) References Cited

FOREIGN PATENT DOCUMENTS

| | | | |
|---|---|---|---|
| CN | 112362247 | A | 2/2021 |
| CN | 215573641 | U | 1/2022 |
| CN | 114739606 | A | 7/2022 |
| CN | 217424687 | U | 9/2022 |

* cited by examiner

LEAKAGE DETECTION DEVICE

CROSS-REFERENCE TO RELATED APPLICATIONS

This application is a National Stage of International Application No. PCT/CN2022/117283, filed on Sep. 6, 2022, which claims priority to Chinese Patent Application No. 202210235616.1, filed on Mar. 11, 2022, both of which are hereby incorporated by reference in their entireties.

TECHNICAL FIELD

The present application relates to the technical field of battery inspection, and particularly, to a leakage inspection device.

BACKGROUND

In a lithium battery production line, leakage inspection is required for a pouch battery after liquid injection and final sealing. The leakage inspection is usually carried out under vacuum, however, residual gas in pipelines and sensors after evacuation may negatively influence accuracy of the inspection. Therefore, after the inspection is completed, it is necessary to wait for the residual gas in the pipeline and the sensor to be discharged, which causes lengthened reset period of the sensor and thus low efficiency of the leakage inspection of the pouch battery.

SUMMARY

Based on the above, it is necessary to provide a leakage inspection device with high inspection efficiency in order to solve the existing problem of low efficiency of leakage inspection of the batteries.

A leakage inspection device, comprising:

- a sealing box with a sealing cavity for accommodating a workpiece;
- a first inspecting component connected to the sealing box and configured for inspecting volatile gases from the workpiece; and
- a second inspecting component connected to the sealing box and configured for inspecting the volatile gases from the workpiece;
- wherein, both the first inspecting component and the second inspecting component comprise a communicating state, an inspecting state, and a discharging state;
- when the first inspecting component or the second inspecting component is in the communicating state, the first inspecting component or the second inspecting component is in communication with the sealing cavity and a gas extracting device;
- when the first inspecting component or the second inspecting component is in the inspecting state, the first inspecting component or the second inspecting component is in communication with the sealing cavity and separated from the gas extracting device;
- when the first inspecting component or the second inspecting component is in the discharging state, the first inspecting component or the second inspecting component is separated from the sealing cavity.

By providing the above leakage inspection device, the battery is placed inside the sealing cavity: firstly, switching the first inspecting component to the communicating state, switching the second inspecting component to the discharging state, vacuumizing the sealing cavity by the gas extracting device, and then switching the first inspecting component to the inspecting state to detect whether there is volatile gas in the sealing cavity, so as to determine whether the battery leaks. When inspecting another battery subsequently, the first inspecting component may be switched to the discharging state to discharge residual gas, and leakage-inspection is performed on the battery inside the sealing cavity by means of the second inspecting component. In this way, the first inspecting component and second inspecting component may operate alternately without waiting for the residual gas in the inspecting component to be discharged, thus increasing the efficiency of leakage inspection.

In one embodiment, the sealing box comprises a baseplate and a cabinet, the baseplate is configured for bearing the workpiece, the cabinet is detachably connected to the baseplate so that the cabinet and the baseplate enclose the sealing cavity, and both the first inspecting component and the second inspecting component are connected to the cabinet.

In one embodiment, the leakage inspection device further comprises a rack and a lift driver, the cabinet and the lift driver are provided on the rack, the lift driver is in transmission connection to the baseplate to drive the baseplate to reciprocate along a first direction, and the baseplate has a sealed position during moving;

- when the baseplate is in the sealed position, the baseplate is connected to the cabinet to enclose the sealing cavity.

In one embodiment, the leakage inspection device further comprises a translation driver, which is provided on the rack and in transmission connection to the lift driver, so as to drive the lift driver to reciprocate along a second direction perpendicular to the first direction, the lift driver having a corresponding position during moving;

- when the lift driver is in the corresponding position, the baseplate corresponds to the cabinet in the first direction, so that the baseplate can move along the first direction to the sealed position.

In one embodiment, the cabinet comprises a transparent roof and a side plate, one end of the side plate is fixedly connected to the transparent roof, and the baseplate is detachably connected to the other end of the side plate facing away from the transparent roof.

In one embodiment, the leakage inspection device further comprises a connecting component, which is connected to the sealing box, is in communication with the sealing cavity, and comprises an unblocked state and a blocked state;

- when the connecting component is in the unblocked state, the sealing cavity is in communication with the outside environment through the connecting component;
- when the connecting component is in the blocked state, the connecting component separates the sealing cavity from the outside.

In one embodiment, the connecting component comprises a first connecting tube and a first control valve, the first connecting tube is connected to the sealing box and is in communication with the sealing cavity, and the first control valve is provided in the first connecting tube for controlling the blocked/unblocked state of the first connecting tube.

In one embodiment, the first inspecting component comprises a second connecting tube, a second control valve, a third control valve and a first detector, the second connecting tube is connected to the sealing box at one end and is in communication with the sealing cavity, and is configured to be in communication with the gas extracting device at the other end, both the second control valve and the third control valve are provided in the second connecting tube, the second control valve is located on one side of the third control valve close to the sealing box, both the second control valve and the third control valve are configured for controlling blocked/unblocked state of the second connecting tube, and the first detector is provided in the second connecting tube and is located between the second control valve and the third control valve for detecting the volatile gases from the workpiece.

In one embodiment, the second inspecting component comprises a third connecting tube, a fourth control valve, a fifth control valve and a second detector, the third connecting tube is connected to the sealing box at one end and is in communication with the sealing cavity, and is configured to be in communication with the gas extracting device at the other end, both the fourth control valve and the fifth control valve are provided in the third connecting tube, the fourth control valve is located on one side of the fifth control valve close to the sealing box, both the fourth control valve and the fifth control valve are configured for controlling blocked/unblocked state of the third connecting tube, and the second detector is provided in the third connecting tube and is located between the fourth control valve and the fifth control valve for detecting the volatile gases from the workpiece.

In one embodiment, the leakage inspection device further comprises an interconnecting pipe and a filter, the interconnecting pipe is in communication with the other end of the second connecting tube facing away from the sealing box, with the other end of the third connecting tube facing away from the sealing box, and with the gas extracting device, and the filter is provided in the interconnecting pip for filtering gas flowing through the interconnecting pipe.

BRIEF DESCRIPTION OF THE DRAWINGS

In order to clearly illustrate embodiments of the present application or technical solutions in the prior art, accompanying drawings that need to be used in description of the embodiments or the prior art will be briefly introduced as follows. Obviously, drawings in following description are only the embodiments of the present application. For those skilled in the art, other drawings can also be obtained according to the disclosed drawings without creative efforts.

DETAILED DESCRIPTION

Figure 1:
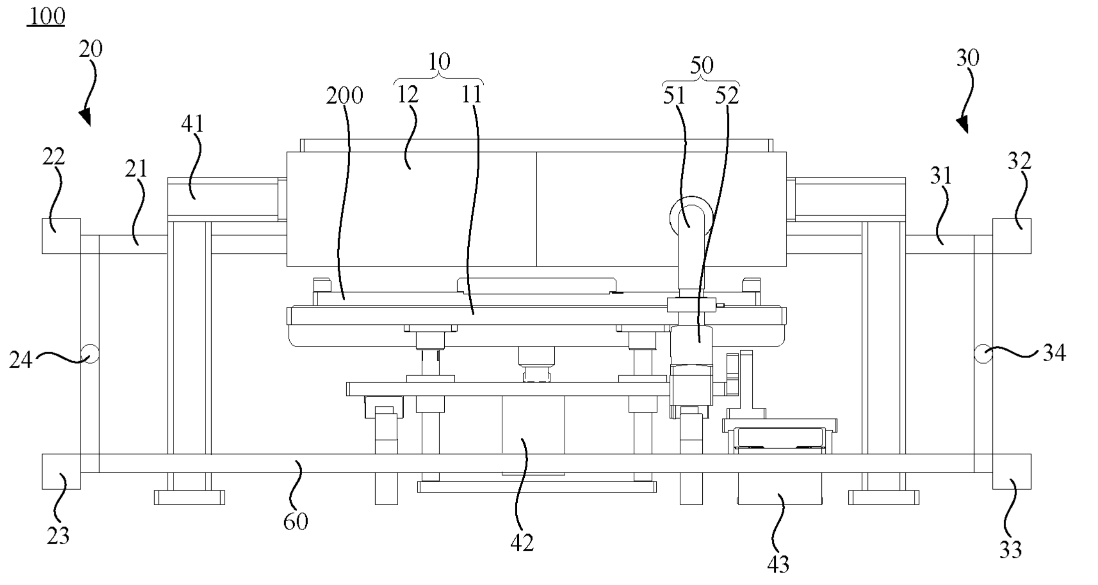
FIG. 1 is a schematic structural illustration of a leakage inspection device according to an embodiment of the present application.

In order to make the above objects, features and advantages of the present application more clearly understood, specific embodiments of the present application will be described in detail below with reference to the accompanying drawings. In a following description, numerous specific details are set forth in order to provide a thorough understanding of the present application. However, the present application can be implemented in many other ways different from those described here, and those skilled in the art can make similar improvements without violating a connotation of the present application. Therefore, the present application is not limited by the specific embodiments disclosed below.

In the description of the present application, it should be understood that, an orientation or positional relationship indicated by terms "center", "longitudinal", "lateral", "length", "width", "thickness", "upper", "lower", "front", "back", "left", "right", "vertical", "horizontal", "top", "bottom", inner", "outer", "clockwise", "counterclockwise", "axial", "radial", "circumferential" is based on the orientation or positional relationship shown in the accompanying drawings, and is only for convenience of describing the present application and simplifying the description, rather than indicating or implying that a device or element referred to must be provided with a particular orientation, be constructed and operate in a particular orientation, and therefore should not be understood as a limitation to the present application.

In addition, terms "first" and "second" are only configured for descriptive purposes and should not be understood as indicating or implying relative importance or implying a number of indicated technical features. Therefore, a feature delimited with "first", "second" may expressly or implicitly include at least one of those features. In a description of the present application, "a plurality" means at least two, such as two, three, etc., unless expressly and specifically defined otherwise.

In the present application, unless expressly specified and limited otherwise, terms "installed", "communicated", "connected", "fixed" and other terms should be interpreted in a broad sense, for example, it can be a fixed connection, a detachable connection, or an integrated; it can be a mechanical connection or an electrical connection; it can be directly connected, or indirectly connected through an intermediate medium, and it can be an internal communication between two elements or an interaction relationship between the two elements, unless otherwise explicitly defined. For those of ordinary skill in the art, specific meanings of the above terms in the present application can be understood according to specific situations.

In the present application, unless expressly stated and defined otherwise, a first feature "on" or "under" a second feature may be that the first feature is in direct contact with the second feature, or the first feature and the second feature are indirectly contacted through an intermediary. In addition, the first feature being "above", "over" and "on" the second feature may mean that the first feature is directly above or obliquely above the second feature, or simply means that the first feature is higher than the second feature in a horizontal direction. The first feature being "below", "under" and "below" the second feature may mean that the first feature is directly below or obliquely below the second feature, or simply means that the first feature is smaller than the second feature in a horizontal direction.

It should be noted that when an element is referred to as being "fixed to" or "arranged on" another element, it can be directly on another element, or there may be an intervening element therebetween. When an element is referred to as being "connected" to another element, it can be directly connected to another element or intervening elements may also be present. Terms "vertical", "horizontal", "upper", "lower", "left", "right" and similar expressions used here are only for illustration purposes rather than indicating the only implementation.

Figure 2:
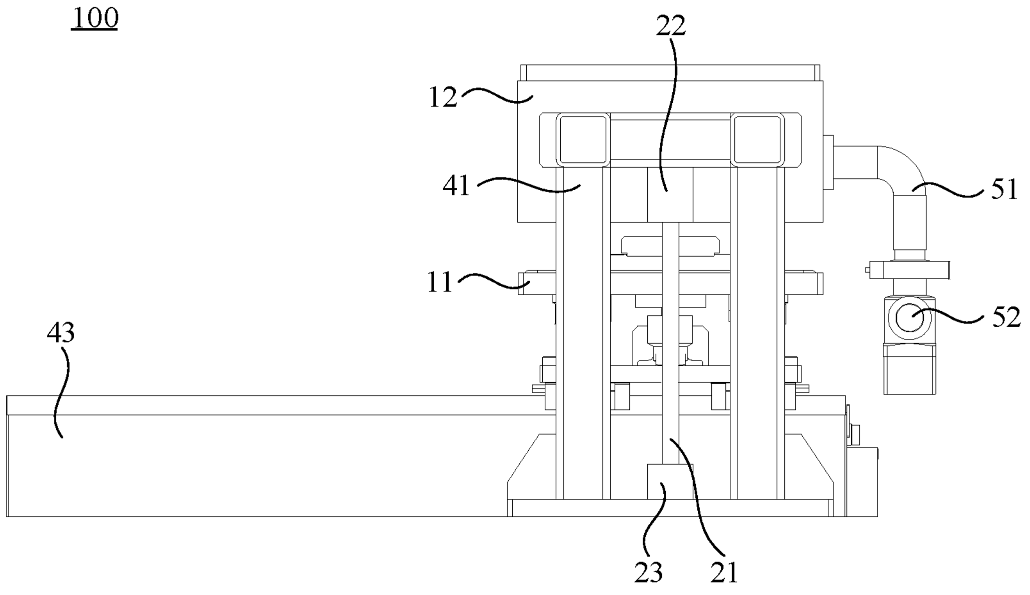
FIG. 2 is a schematic structural illustration of the left side of the leakage inspection device shown in FIG. 1.

As shown in FIGS. 1 and 2, a leakage inspection device 100 provided in the embodiment of the present application comprises a sealing box 10, a first inspecting component 20 and a second inspecting component 30.

The sealing box 10 has a sealing cavity for accommodating a workpiece 200. Both the first inspecting component 20 and the second inspecting component 30 are connected to the sealing box 10 and configured for inspecting volatile gases from the workpiece 200. Both the first inspecting component 20 and the second inspecting component 30 comprise a communicating state, an inspecting state, and a discharging state.

When the first inspecting component 20 or the second inspecting component 30 is in the communicating state, the first inspecting component 20 or the second inspecting component 30 is in communication with the sealing cavity and a gas extracting device.

When the first inspecting component 20 or the second inspecting component 30 is in the inspecting state, the first inspecting component 20 or the second inspecting component 30 is in communication with the sealing cavity and separated from the gas extracting device.

When the first inspecting component 20 or the second inspecting component 30 is in the discharging state, the first inspecting component 20 or the second inspecting component 30 is separated from the sealing cavity.

It should be noted that in the present embodiment, the workpiece 200 is a battery, and the volatile gas is the volatile gas from the electrolyte in the battery.

By providing the above leakage inspection device, the battery is placed inside the sealing cavity, firstly, switching the first inspecting component 20 to the communicating state, switching the second inspecting component 30 to the discharging state, and vacuumizing the sealing cavity by the gas extracting device, and then switching the first inspecting component 20 to the inspecting state to detect whether there is volatile gas in the sealing cavity, so as to determine whether the battery leaks. When inspecting another battery subsequently, the first inspecting component 20 may be switched to the discharging state to discharge the residual gas, and leakage-inspection is performed on the battery inside the sealing cavity by means of the second inspecting component 30. In this way, the first inspecting component 20 and second inspecting component 30 may operate alternately without waiting for the residual gas in the inspecting component to be discharged, thus increasing the efficiency of the leakage inspection.

It should be explained that when the first inspecting component 20 or the second inspecting component 30 is in the discharging state, the first inspecting component 20 or the second inspecting component 30 is in communication with the gas extracting device and separated from the sealing cavity, and thus the first inspecting component 20 or the second inspecting component 30 can be evacuated by gas extracting device, so that the residual gas in the first inspecting component 20 or the second inspecting component 30 can be extracted.

It can be determined that during inspecting by the first inspecting component 20, the second inspecting component 30 is in the discharging state, and the first inspecting component 20 and the second inspecting component 30 may operate alternately. Therefore, when the battery inside the sealing cavity is inspected by the second inspecting component 30, the first inspecting component 20 is always in the discharging state, thereby discharging the residual gas in the first inspecting component 20.

The inspecting process of the second inspecting component 30 is the same as that of the first inspecting component 20. That is, firstly, switching the second inspecting component 30 to the communicating state, and vacuumizing the sealing cavity by the gas extracting device, and then switching the second inspecting component 30 to the inspecting state to detect whether there is volatile gas in the sealing cavity.

In addition, it should be noted that the first inspecting component 20 and the second inspecting component 30 may be extracted by two gas extracting devices, or may be connected to the same gas extracting device in turn, or may be connected to the same gas extracting device at the same time without interference.

In some embodiments, the sealing box 10 comprises a baseplate 11 and a cabinet 12, the baseplate 11 is configured for bearing the workpiece 200, the cabinet 12 is detachably connected to the baseplate 11 to enclose the sealing cavity, and both the first inspecting component 20 and the second inspecting component 30 are connected to the cabinet 12.

It should be noted that the baseplate 11 is provided with a positioning structure. The workpiece 200 may be placed inside the sealing cavity by detaching the baseplate 11 from the cabinet 12, then positioning the workpiece 200 on the baseplate 11 with the positioning structure, and then connecting the baseplate 11 with the cabinet 12.

In addition, in order to ensure the sealing performance of the sealing cavity, the baseplate 11 is also provided with a sealing ring.

In some embodiments, the cabinet 12 comprises a transparent roof and a side plate, one end of the side plate is fixedly connected to the transparent roof, and the baseplate 11 is detachably connected to the other end of the side plate facing away from the transparent roof, so as to enclose the above sealing cavity. In this way, when evacuating the sealing cavity, the sealing of the battery may be directly determined from whether there is deformation of the battery inside the sealing cavity, which may be observed through the transparent roof.

In some embodiments, the leakage inspection device further comprises a visual component, which is provided on the side of the transparent roof facing away from the baseplate 11 and is configured for detecting the shape and size of the battery inside the sealing cavity, so as to determine whether the battery is deformed in the process of vacuumizing the sealing cavity according to the shape and size, and then determine the sealing performance of the battery.

In some embodiments, the leakage inspection device 100 further comprises a rack 41 and a lift driver 42, both the cabinet 12 and the lift driver 42 are provided on the rack 41, the lift driver 42 is in transmission connection to the baseplate 11 to drive the baseplate 11 to reciprocate along a first direction, and the baseplate 11 has a sealed position during moving.

When the baseplate 11 is in the sealed position, the baseplate 11 is connected to the cabinet 12 to enclose the sealing cavity.

Wherein, the first direction is the up-down direction in FIGS. 1 and 2, and is the vertical direction in a practical application.

Specifically, the lift driver 42 is a gas cylinder.

In some embodiments, the leakage inspection device 100 further comprises a translation driver 43, which is provided on the rack 41 and in transmission connection to the lift driver 42, so as to drive the lift driver 42 to reciprocate along a second direction, and the lift driver 42 has a corresponding position during moving.

When the lift driver 42 is in the corresponding position, the baseplate 11 corresponds to the cabinet 12 in the first direction, so that the baseplate 11 can move along the first direction to the sealed position, and be connected to the cabinet 12 to enclose the sealing cavity.

Wherein, the second direction is perpendicular to the first direction, is perpendicular to the paper in FIG. 1 and is the left-right direction in FIG. 2.

It is to be understood that the translation driver 43 drives the lift driver 42 to move away from the corresponding position along the second direction so that the baseplate 11 is moved out from directly below the cabinet 12, then placing the battery on the baseplate 11, next driving the lift driver to move back to the corresponding position by the translation driver 43, and subsequently driving the baseplate 11 to rise to connect with the cabinet 12 by the lift driver 42 so as to enclosure to form the sealing cavity, and the battery is provided inside the sealing cavity.

Specifically, the translation driver 43 is an electric cylinder or a gas cylinder.

In some embodiments, the leakage inspection device 100 further comprises a connecting component 50, which is connected to the sealing box 10, is in communication with the sealing cavity, and comprises an unblocked state and a blocked state.

When the connecting component 50 is in the unblocked state, the sealing cavity is in communication with the outside environment through the connecting component 50.

An example is illustrated by performing leakage inspection on the workpiece 200 via first inspecting component 20:

the connecting component 50 is in the blocked state first, and when the first inspecting component 20 enters the communicating state, the gas extracting device vacuumizes the sealing cavity; after vacuumizing, the first inspecting component 20 enters the inspecting state; after the inspection is completed, it is necessary to break the vacuum of the sealing cavity to separate the cabinet 12 from the baseplate 11; synchronously, the connecting component 50 enters the unblocked state to break the vacuum of the sealing cavity; at the same time, the first inspecting component 20 enters the communicating state, and the gas extracting device discharges gas from the sealing cavity and the first inspecting component 20. After discharging, the first inspecting component 20 is switched to the discharging state, and the gas extracting device vacuumizes the first inspecting component 20 to further discharge gas from the first inspecting component 20.

In a practical application, the connecting component 50 comprises a first connecting tube 51 and a first control valve 52, the first connecting tube 51 is connected to the sealing box 10 and is in communication with the sealing cavity, and the first control valve 52 is provided in the first connecting tube for controlling the blocked/unblocked state of the first connecting tube 51.

In other words, when the first control valve 52 is turned on, the connecting component 50 is in the unblocked state, and when the first control valve 52 is turned off, the connecting component 50 is in the blocked state.

Meanwhile, it should be noted that in the case where the connecting component 50 is not provided, the vacuum of the sealing cavity may be broken by switching the first inspecting component 20 or second inspecting component 30 to the communicating state after the inspection is completed; the baseplate 11 is separated from the cabinet 12 after the vacuum is broken; and then the first inspecting component 20 or the second inspecting component 30 is switched to the discharging state, and the gas extracting device is used to vacuumize the first inspecting component 20 or the second inspecting component 30.

In some embodiments, the first inspecting component 20 comprises a second connecting tube 21, a second control valve 22, a third control valve 23 and a first detector 24, the second connecting tube 21 is connected to the sealing box 10 at one end and is in communication with the sealing cavity, and is configured to be in communication with the gas extracting device at the other end. Both the second control valve 22 and the third control valve 23 are provided in the second connecting tube 21, the second control valve 22 is located on one side of the third control valve 23 close to the sealing box 10. Both the second control valve 22 and the third control valve 23 are configured for controlling blocked/unblocked state of the second connecting tube 21, and the first detector 24 is provided in the second connecting tube 21 and is located between the second control valve 22 and the third control valve 23 for detecting the volatile gases from the workpiece 200.

Assuming that the space between the second control valve 22 and the third control valve 23 within the second connecting tube 21 is an inspection space, then the first detector 24 is located in the inspection space.

It should be explained that when the first inspecting component 20 is in the communicating state, both the second control valve 22 and the third control valve 23 are turned on, and the gas extracting device is in communication with the sealing cavity through the second connecting tube 21, thereby vacuumizing the sealing cavity.

When the first inspecting component 20 is in the inspecting state, the second control valve 22 is turned on, the third control valve 23 is turned off, the inspection space is in communication with the sealing cavity and separated from the gas extracting device, and the first detector 24 may detect whether the volatile gas from the battery exists in the sealing cavity.

When the first inspecting component 20 is in the discharging state, the second control valve 22 is turned off, the third control valve 23 is turned on, the inspection space is separated from the sealing cavity but communicated with the gas extracting device, and the gas extracting device vacuumize the inspection space to extract the residual gas out of the inspection space.

In some embodiments, the second inspecting component 30 comprises a third connecting tube 31, a fourth control valve 32, a fifth control valve 33 and a second detector 34. The third connecting tube 31 is connected to the sealing box 10 at one end and is in communication with the sealing cavity, and is configured to be in communication with the gas extracting device at the other end. Both the fourth control valve 32 and the fifth control valve 33 are provided in the third connecting tube 31, the fourth control valve 32 is located on one side of the fifth control valve 33 close to the sealing box 10. Both the fourth control valve 32 and the fifth control valve 33 are configured for controlling blocked/unblocked state of the third connecting tube 31, and the second detector 34 is provided in the third connecting tube 31 and is located between the fourth control valve 32 and the fifth control valve 33 for detecting the volatile gases from the workpiece 200.

Since the structure of the second inspecting component 30 is the same as that of the first inspecting component 20, similarly, when the second inspecting component 30 is in the communicating state, both the fourth control valve 32 and the fifth control valve 33 are turned on; when the second inspecting component 30 is in the inspecting state, the fourth control valve 32 is turned on, and the fifth control valve 33 is turned off; when the second inspecting component 30 is in the discharging state, the fourth control valve 32 is turned off, and the fifth control valve 33 is turned on.

In some embodiments, both the first detector 24 and the second detector 34 are odor sensors. The internal medium of the odor sensor reacts with the volatile gas from the electrolyte to output a voltage value, and then the system determines whether the battery leaks according to the fluctuation range of the voltage value.

In some embodiments, the leakage inspection device 100 further comprises an interconnecting pipe 60, which is in communication with the other end of the second connecting tube 21 facing away from the sealing box 10, with the other end of the third connecting tube 31 facing away from the sealing box 10, and with the gas extracting device In some embodiments, the first inspecting component 20 and the second inspecting component 30 are in communication via the interconnecting pipe 60, and the interconnecting pipe 60 may be connected to one gas extracting device so as to reduce the gas extraction cost. Meanwhile, in the present embodiment, both the first inspecting component 20 and the second inspecting component 30 further comprises a disconnected state.

When the first inspecting component 20 or the second inspecting component 30 is in the disconnected state, the first inspecting component 20 or the second inspecting component 30 is separated from the sealing cavity and the gas extracting device, so as to prevent the first inspecting component 20 and the second inspecting component 30 from interfering with each other when performing the inspection.

Meanwhile, it can be understood that when the first inspecting component 20 performs inspection on the workpiece 200, the second inspecting component 30 is in the disconnected state; similarly, when the second inspecting component 30 performs inspection on the workpiece 200, the first inspecting component 20 is in the disconnected state.

In some embodiments, the leakage inspection device further comprises a filter, which is provided in the interconnecting pipe 60 for filtering gas flowing through the interconnecting pipe 60, so as to filter the volatilized electrolyte.

In order to facilitate the understanding of the technical scheme of the present application, the inspection process of the first inspecting component 20 in the above embodiment is described herein in conjunction with FIG. 1:

Initially, the baseplate 11 is connected to the cabinet 12, there is no battery inside the sealing cavity, and the first control valve 52, the second control valve 22, the third control valve 23, the fourth control valve 32 and the fifth control valve 33 are all turned off.

The lift driver 42 drives the baseplate 11 to descend firstly, then the translation driver 43 drives the lift driver 42 to move out of the corresponding position, the manipulator places the battery on the baseplate 11, the positioning structure fixes the battery, then the translation driver 43 drives the lift driver 42 to move to the corresponding position, and the lift driver 42 then drives the baseplate 11 to rise to the sealed position to connect with the cabinet 12, thereby forming a sealing cavity.

After the baseplate 11 is connected to the cabinet 12, the second control valve 22 and the third control valve 23 are turned on, the gas extracting device operates to vacuumize the sealing cavity, the visual component may be used to detect whether the battery is deformed in the process of vacuumizing, and if not, the subsequent operation will be continued.

After the vacuum degree meets the requirement, the gas extracting device and the third control valve 23 are turned off, the first detector 24 detects whether there is volatile gas in the sealing cavity, the first control valve 52 and the second control valve 23 are turned off after the inspection is completed, and meanwhile, the gas extracting device operates to break the vacuum of the sealing cavity and replace the gas in the sealing cavity and the second connecting tube 21.

Next, the first control valve 52 and the second control valve 22 are turned off, the gas extracting device discharges the gas out of the inspection space to discharge the residual gas in the inspection space, and the third control valve 23 and the gas extracting device are turned off after the residual gas is discharged. Then, the lift driver 42 drives the baseplate 11 to descend, the translation driver 43 drives the lift driver 42 to move out of the corresponding position, and the manipulator removes the inspected battery and replaces it with the next battery.

It can be understood that the next battery is inspected by the second inspecting component 30, and the inspection process of the second inspecting component 30 is similar to that of the first inspecting component 20, which is not repeated herein.

The technical features of the above embodiments can be combined arbitrarily. For the sake of brevity, not all possible combinations of the individual technical features of the above embodiments are described. However, a combination of these technical features shall be considered to be within the scope of the present specification, as long as there is no contradiction in the combination.

The above embodiments are merely expressions of a few implementations of the present application described in a specific and detailed manner, and are not to be construed as limitation to the scope of the present application. It is to be noted that for a person of ordinary skill in the art, various modifications and improvements could be made without departing from the principle of the present application, and shall fall into the protection scope of the present application. Therefore, the protection scope of the present application shall be subject to the appended claims.

The invention claimed is:

1. A leakage inspection device, comprising:

a first inspecting component connected to a sealing box and configured, for inspecting volatile gases from a workpiece; and a second inspecting component connected to the sealing box, and configured for inspecting the volatile gases from the workpiece;

wherein, both the first inspecting component and the second inspecting component are adapted for a communicating state, an inspecting state, and a discharging state;

wherein each of the first inspecting component and the second inspecting component, when in its communicating state, is adapted for communication with a sealing cavity and a gas extracting device;

wherein each of the first inspecting component and the second inspecting component, when in its inspecting state, is adapted for communication with the sealing cavity and separated from the gas extracting device; and wherein each of the first inspecting component and the second inspecting component, when in its discharging state, is separated from the sealing cavity.

2. The leakage inspection device of claim 1, wherein, the sealing box comprises a baseplate and a cabinet, the baseplate is configured for bearing the workpiece, the cabinet is detachably connected to the baseplate so that the cabinet and the baseplate enclose the sealing cavity, and both the first inspecting component and the second inspecting component are connected to the cabinet.

3. The leakage inspection device of claim 2, wherein, the leakage inspection device further comprises a rack and a lift driver, the cabinet and the lift driver are provided on the rack, the lift driver is in transmission connection to the baseplate to drive the baseplate to reciprocate along a first direction, and the baseplate has a sealed position during moving;

when the baseplate is in the sealed position, the baseplate is connected to the cabinet to enclose the sealing cavity.

4. The leakage inspection device of claim 3, wherein, the leakage inspection device further comprises a translation driver, which is provided on the rack and in the transmission connection to the lift driver, so as to drive the lift driver to reciprocate along a second direction perpendicular to the first direction, the lift driver having a corresponding position during moving;

when the lift driver is in the corresponding position, the baseplate corresponds to the cabinet in the first direction, so that the baseplate is adaptable to move along the first direction to the sealed position.

5. The leakage inspection device of claim 2, wherein, the cabinet comprises a transparent roof and a side plate, an end of the side plate is fixedly connected to the transparent roof, and the baseplate is detachably connected to the other end of the side plate facing away from the transparent roof.

6. The leakage inspection device of claim 1, wherein, the leakage inspection device further comprises a connecting component, connecting to the sealing box, communicating with the sealing cavity, and adapted for an unblocked state and a blocked state;

wherein in the unblocked state, the sealing cavity is in communication with an outside environment through the connecting component; and wherein in the blocked state, the connecting component separates the sealing cavity from the outside environment.

7. The leakage inspection device of claim 6, wherein, the connecting component comprises a first connecting tube and a first control valve, the first connecting tube is connected to the sealing box for communicating with the sealing cavity, and the first control valve is provided in the first connecting tube for controlling the blocked/unblocked state of the first connecting tube.

8. The leakage inspection device of claim 1, wherein, the first inspecting component comprises a second connecting tube, a second control valve, a third control valve, and a first detector, the second connecting tube is connected to the sealing box at one end for communicating with the sealing cavity, and is configured to be in communication with the gas extracting device at the other end, both the second control valve and the third control valve are provided in the second connecting tube, the second control valve is located on one side of the third control valve close to the sealing box, both the second control valve and the third control valve are configured for controlling blocked/unblocked state of the second connecting tube, and the first detector is provided in the second connecting tube and is located between the second control valve and the third control valve for detecting the volatile gases from the workpiece.

9. The leakage inspection device of claim 8, wherein, the second inspecting component comprises a third connecting tube, a fourth control valve, a fifth control valve, and a second detector, the third connecting tube is connected to the sealing box at one end for communicating with the sealing cavity, and is configured to be in communication with the gas extracting device at the other end, both the fourth control valve and the fifth control valve are provided in the third connecting tube, the fourth control valve is located on one side of the fifth control valve close to the sealing box, both the fourth control valve and the fifth control valve are configured for controlling blocked/unblocked state of the third connecting tube, and the second detector is provided in the third connecting tube and is located between the fourth control valve and the fifth control valve for detecting the volatile gases from the workpiece.

10. The leakage inspection device of claim 9, wherein, the leakage inspection device further comprises an interconnecting pipe and a filter, the interconnecting pipe is in communication with the other end of the second connecting tube facing away from the sealing box, with the other end of the third connecting tube facing away from the sealing box, and with the gas extracting device, and the filter is provided in the interconnecting pipe for filtering gas flowing through the interconnecting pipe.

* * * * *